June 6, 1939.  E. R. GILLILAND  2,160,854
PRODUCTION OF ISOPROPYL ETHER
Filed Feb. 27, 1936
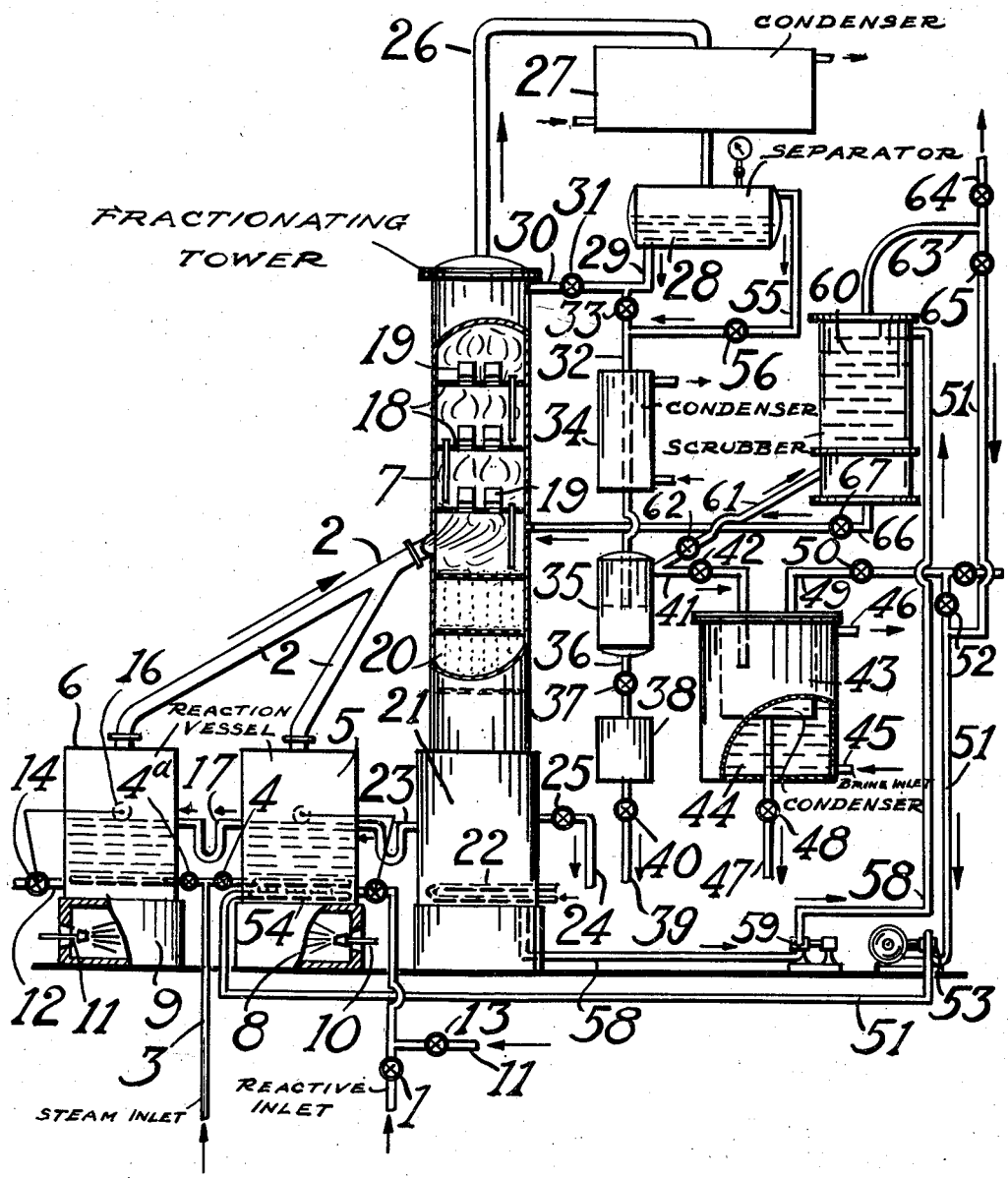
Edwin R. Gilliland Inventor
By P. L. Young Attorney Patented June 6, 1939

2,160,854

UNITED STATES PATENT OFFICE 2,160,854

PRODUCTION OF ISOPROPYL ETHER

Edwin R. Gilliland, Cambridge, Mass., assignor to Standard Alcohol Company, a corporation of Delaware Application February 27, 1936, Serial No. 65,950

5 Claims. (Cl. 260—614)

This invention relates to a process and apparatus for the manufacture of ethers, and relates particularly to a process of producing ethers from olefins or olefinic gases containing propylene and the higher homologues thereof.

Ethers are generally manufactured from the corresponding alcohols. An alcohol is contacted with strong sulfuric acid and two molecules of the alcohol are condensed with water being split off, to form one molecule of ether. Other polybasic acids such as phosphoric, arsenic, and boric behave like sulfuric acid. Acids such as hydrochloric at 170° C. and sulfo-acids, e. g. benzene sulfonic at 145° C., also react similarly. Where secondary alcohols are reacted with an acid on heating to the reacting temperature the ether is formed but there also takes place a reversion to the olefins.

An object of this invention is to increase the yields of ethers and particularly to manufacture ethers directly from olefins by using lower temperatures.

These and other objects of this invention will be more clearly understood on reading the following description in conjunction with the accompanying drawing where a preferred apparatus is illustrated diagrammatically and partly in section.

Referring to the drawing, numeral 1 denotes the inlet pipe through which reactive liquor prepared by contacting olefins such as propylene with a hydrating acid catalyst, is passed into reaction vessel 5. Water, preferably in the form of steam, is passed through pipe 3 provided with valves 4 and 4a into reaction vessels 5 and 6 to heat and dilute the reactive liquor. Pipe 2 is used to pass the vapors from the reaction vessels 5 and 6 into the fractionating tower 7. A plurality of reaction vessels may be used, though two reaction vessels connected in series are preferred. The reaction vessels 5 and 6 are in furnace settings 8 and 9, to which heat is supplied by means of burners 10 and 11. Other means of heating may be provided.

In preparing ether from an olefin by contacting said olefin with a hydrating acid catalyst, it is necessary that the acid, if sulfuric acid be used, be of at least 80% concentration, preferably 92%, but these high concentrations are not used when the acid liquor is hydrolyzed. In hydrolyzing the acid liquor should be diluted to a concentration from about 50% to 65% sulfuric acid, preferably about 60%, when a pressure of about 1 atmosphere is maintained. Acids stronger than 65% give considerable $SO_2$ formation and polymerization though at lower pressures especially those below atmospheric stronger acids may be used with comparable results to those obtained with 60% acid concentration. Therefore in this process the reactive liquor passing into the reaction vessel is diluted to about 60% concentration of sulfuric acid. By means of the heat supplied by the burners 10 and 11, ether, together with alcohol, polymers, and water, is passed into the fractionating tower 7. Substantially all of the sulfuric acid is separated from the ether, alcohol, polymers and water and retained in the reaction vessels 5 and 6 where a constant volume is therein maintained by means of pipe 12 provided with valve 14 in conjunction with valve level regulating float 16, and U pipe 17. Alternatively the reactive liquor may be dilute before passing into reactive vessel 5 by passing water into pipe 1 thru pipe 11, provided with valve 13.

The fractionating tower is provided with plates 18 and bell caps 19 in order to obtain good separation of the ether from water, alcohol and polymers. Other types of towers can be used, such as packed towers. The lower part of the tower or the stripping section 20 is likewise provided with plates. At the bottom of the tower is a reboiling section 21 which is heated by means of a steam coil 22. The level of the liquid which is substantially dilute alcohol in this reboiling section is maintained at the same level as that in the reaction vessels 5 and 6 by means of U pipe 23 through which the dilute alcohol is carried off to the reaction vessel 5 from the reboiling section 21.

The polymers, if any are separated, are removed from the reboiling section 21 by means of pipe 24 provided with valve 25. The polymers generally do not form a separate layer, as they are soluble in the dilute alcohol and therefore remain in solution. The ether that is separated in the fractionating tower is passed by means of pipe 26 through condenser 27 into liquid-gas separator 28. From the separator 28 the condensate is withdrawn by means of pipe 29. Part of this condensate is passed as reflux through pipe 30 provided with valve 31 into the upper part of the fractionating tower 7. The remaining part of this liquid is passed through pipe 32 provided with valve 33 through the condenser 34 into a liquid-gas separator 35 from which separator ether is withdrawn through pipe 36 provided with valve 37 into container 38 and to storage (not shown) by means of pipe 39 provided with valve 40. The gases separating in the separator 35 are passed through pipe 41 provided with valve 42 into the condenser 43 which is maintained at a very low temperature by means of the circulating brine solution, the brine solution being introduced into the jacket 44 by means of pipe 45 and withdrawn by means of pipe 46. The ether condensed in this condenser is withdrawn by means of pipe 47 provided with valve 48, the gas being withdrawn by means of pipe 49 provided with valve 50. A part of this olefin gas may be passed through pipe 51 provided with valve 52 by means of pump 53 into the lower part of the reaction vessel 5. This gas is passed in very finely distributed form into the reaction vessel by means of the sprayer 54 which may be a metal pipe with very minute holes or an Alundum tube through whose walls the gas will pass in very fine form. By the use of this gas, a better separation of the ether from the acid liquor is obtained. More ether is distilled over and thereby the yields of ether are increased.

The gases separated in separator 28 are withdrawn from the separator by means of pipe 55 provided with valve 56 are passed in pipe 32, through condenser 34 into separator 35.

A part of the liquid in the bottom of the reboiling section 21 may be withdrawn through pipe 58 by means of pump 59 and passed into the scrubber 60 through which all or part of the gas removed from separator 35 is passed by means of pipe 61 provided with valve 62. The scrubbed gas is removed through pipe 63 provided with valves 64 and 65 in order that the gas may be passed either to storage (not shown), to be recirculated through the absorber (not shown) or into the reaction vessel 5 by means of pipe 51. The liquor from the scrubbing tower 60 is passed by means of pipe 66 provided with valve 67 to the fractionating tower 7.

By the reactive liquor being diluted and quickly hydrolyzed in the reaction vessels 5 and 6 the ether, alcohol, polymers and water are rapidly passed to the fractionating tower 7. High temperatures are not required in this fractionating tower as temperatures of 80° to 90° C. will quickly separate the ether as a vapor, though high temperatures are used in the manufacture of ethers from reactive liquors, but these same high temperatures are not required for fractionation and thereby a reversion of the ethers to olefins is avoided. The formation of high boiling polymers is reduced to a minimum, as these polymers are not subjected to high reaction temperatures over prolonged periods of time in the presence of sulfuric acid.

Alternatively the process may be modified in passing the vapors from the reaction vessels to a condenser and separating the condensate from the olefin gases, the condensate then being fed to the fractionating column which is operated in the usual way with a reboiler as pointed out above.

Other solvents may be used in washing the gases in scrubber 60, for example, mineral oil, though alcohol is preferred, as it is an excellent solvent for ether; the alcohol mechanically carried over by the olefin can be reacted with the acid to form ether and no additional equipment is required to separate the ether as it may be returned to the fractionating tower.

It will be understood that the foregoing description is merely illustrative of the invention and various changes and alternative procedures and proportions may be adopted within the scope of the appended claims in which it is my intention to claim all novelty as broadly as the prior art permits.

I claim:

1. The process of manufacturing isopropyl ether from propylene which comprises contacting gases containing propylene with sulfuric acid of at least 80% concentration to form a reactive acid liquor, diluting the acid liquor with steam to an acid concentration from about 50 to 65% sulfuric acid while heating at the same time to vaporize the more volatile fractions, fractionating the vapors and separating the isopropyl ether.

2. The process of manufacturing isopropyl ether from propylene which comprises forming an acid liquor by contacting propylene with sulfuric acid of an acid concentration of 92%, diluting the acid liquor with water to an acid concentration of 60% while maintaining a pressure of one atmosphere, at the same time heating the reactive acid liquor to vaporize the more volatile fractions, fractionating the vapors and separating the isopropyl ether.

3. The process of manufacturing ethers from olefins which comprises contacting olefins with aqueous hydrating acid of over 80% concentration to form a reactive acid liquor, diluting the acid liquor with steam to an acid concentration from about 50 to 65% aqueous hydrating acid at a pressure of about 1 atmosphere while simultaneously vaporizing the more volatile fractions, fractionating the vapors at a temperature of approximately 80 to 90° C., and separating the ether.

4. The process of manufacturing ethers from olefins which comprises contacting olefins with aqueous hydrating acid of over 80% concentration, diluting the acid liquor formed with water in the form of steam to an acid concentration of not over 65% at a pressure greater than that of atmospheric pressure, while simultaneously heating the reactive acid liquor to vaporize the more volatile fractions, fractionating the vapors and separating the ether.

5. In the process of manufacturing ethers from olefins where olefins are absorbed in aqueous hydrating acid of over 80% strength to form reactive acid liquors, an improvement which comprises reducing the water vapor maintained at an elevated temperature the acid strength of the liquor below its strength at the absorption stage to a hydrolyzing strength and simultaneously vaporizing the more volatile fractions, fractionating the vapors and separating the ethers.

EDWIN R. GILLILAND.